(12) United States Patent
Høy-Petersen et al.

(10) Patent No.: US 9,289,715 B2
(45) Date of Patent: Mar. 22, 2016

(54) FLUE GAS SCRUBBING APPARATUS AND METHODS THEREOF

(75) Inventors: Nils Høy-Petersen, Haslum (NO);
Johan Ivar Ervik, Trondhjem (NO);
Riki Canari, M.P Harei Yehuda (IL)

(73) Assignee: CLEAN MARINE AS, Oslo (NO)

( * ) Notice: Subject to any disclaimer, the term of this patent is extended or adjusted under 35 U.S.C. 154(b) by 547 days.

(21) Appl. No.: 13/812,184

(22) PCT Filed: Jul. 25, 2011

(86) PCT No.: PCT/IL2011/000598
§ 371 (c)(1),
(2), (4) Date: Mar. 29, 2013

(87) PCT Pub. No.: WO2012/014199
PCT Pub. Date: Feb. 2, 2012

(65) Prior Publication Data
US 2013/0213231 A1    Aug. 22, 2013

(30) Foreign Application Priority Data
Jul. 25, 2010    (IL) .......................................... 207208

(51) Int. Cl.
*B01D 53/18* (2006.01)
*B01D 53/14* (2006.01)
*B01D 53/50* (2006.01)
*B01D 53/79* (2006.01)

(52) U.S. Cl.
CPC .............. *B01D 53/14* (2013.01); *B01D 53/502* (2013.01); *B01D 53/504* (2013.01); *B01D 53/79* (2013.01); *B01D 2251/30* (2013.01); *B01D 2251/404* (2013.01); *B01D 2252/1035* (2013.01); *B01D 2257/302* (2013.01); *B01D 2257/404* (2013.01); *B01D 2257/504* (2013.01); *B01D 2257/7027* (2013.01); *B01D 2258/0283* (2013.01); *B01D 2259/124* (2013.01); *B01D 2259/4566* (2013.01); *F23J 2219/40* (2013.01)

(58) Field of Classification Search
None
See application file for complete search history.

(56) References Cited

U.S. PATENT DOCUMENTS

| | | | | | |
|---|---|---|---|---|---|
| 3,912,469 | A | * | 10/1975 | Ewan et al. ..................... | 96/311 |
| 3,989,488 | A | * | 11/1976 | Wisting ......................... | 96/237 |
| 4,286,973 | A | * | 9/1981 | Hamlin et al. ................. | 95/219 |
| 5,178,653 | A | * | 1/1993 | Lilja et al. ..................... | 96/312 |
| 2005/0142052 | A1 | * | 6/2005 | Rosen ......................... | 423/215.5 |

FOREIGN PATENT DOCUMENTS

EP    0509521    * 10/1992

OTHER PUBLICATIONS

Written opinion of WO2012014199. Jan. 25, 2013 Accessed Jul. 8, 2015.*

* cited by examiner

*Primary Examiner* — Duane Smith
*Assistant Examiner* — Phillip Shao

(57) ABSTRACT

An improved flue gas scrubbing apparatus and method are disclosed. The flue gas scrubber comprises a double-pipe or a two-pipe system whereby flue gas enters the system. Scrubbing is accomplished by interaction between the flue gas and base in a pre-injection zone, followed by further reaction in a primary injection zone and passage through a cyclone unit. In preferred embodiments of the invention, it comprises a bypass system by which flue gas is automatically exhausted directly to the atmosphere in case of a system failure. The gas exhausted from the apparatus following scrubbing meets or exceeds international emissions standards.

20 Claims, 10 Drawing Sheets

FLUE GAS SCRUBBING APPARATUS AND METHODS THEREOF

CROSS-REFERENCE TO RELATED APPLICATIONS

This application is a national phase entry under 35 U.S.C. 371(c) of International (PCT) Application No. PCT/IL2011/000598 (filed 25 Jul. 2011), which claims priority to Israel Patent Application No. 207208 (filed 25 Jul. 2010), both of which are hereby incorporated by reference in their entirety.

FIELD OF THE INVENTION

This invention relates to means and methods for scrubbing flue gas of undesired chemical and/or particulate matter. In particular, it relates to means and methods that are designed to be operated in locations with limited available space such as ships.

BACKGROUND OF THE INVENTION

Ships are fast becoming the largest source of air pollution in the EU. Unless more action is taken, by 2020, they will be a more significant source of gas and particulate pollution than all land sources combined.

As a result, the International Maritime Organization (IMO) has strengthened its requirements for reduction of emissions of sulfur oxides ($SO_x$) and particulate matter (PM) (59th session of the Marine Environment Protection Committee, 16 Jul. 2009). While one method for reducing $SO_x$ emissions is the use of low-sulfur fuels, IMO regulations allow as an alternative the use of technologies that abate the sulfur content in the emitted gas.

Wet scrubbers using sodium hydroxide solution are widely used in flue gas desulfurization (FGD). Since equipment size is particularly critical on board ships, where the available space is limited, it is critical that the apparatus be as economical of space as possible while maximizing the contact between the liquid and the flue gas. Other factors limiting a wet scrubber for use on board a ship include weight and electrical power limitations. Typical wet scrubbers remove some 80% of the $SO_x$ from the flue gas. In many cases, this amount of $SO_x$ reduction is not sufficient.

Japanese Pat. No. 8281055 discloses a flue gas scrubbing apparatus in which gas entering the scrubber flows in a circular motion about the circumference of an exhaust pipe. U.S. Pat. No. 4,273,750 discloses a similar method for a dry flue gas scrubber. U.S. Pat. No. 4,334,897 discloses a wet flue gas scrubbing apparatus in which gas-liquid contact is maximized by forcing the gas through a series of baffles. This apparatus, however, is not particularly compact or simply designed.

To date, most applications have utilized one scrubber per source. Most of these scrubbers are "spray tower" types with large volumes and relatively low gas flow speeds. Thus, there remains a long-felt need for a wet flue gas scrubber that is efficient, compact, and of straightforward design, in particular, one that meets these technical requirements while being sufficiently compact to be used, e.g., on board a ship.

SUMMARY OF THE INVENTION

The flue gas scrubbing apparatus herein disclosed is designed to meet this long-felt need. In a preferred embodiment of the invention, the input and output pipes are concentrically disposed, thus reducing the space needed for the apparatus. As described in detail below, the apparatus disclosed herein has high efficiency for two primary reasons. First, it comprises means for accelerating the flow of gas through the apparatus (e.g. fans) wherein these means are located distant from the point at which the flue gas enters. Rather than relying on the pressure of the incoming gas to drive the flow through the system, the fans create a pressure differential that provides significantly higher flow and hence higher efficiency, thus reducing the space needed and the weight of the apparatus. Space and weight are further reduced by using a combination of fans and gas recirculation, enabling a single scrubbing unit to be used for a plurality of sources of flue gas. The additional power required would in any case have to be provided at least in part by the turbochargers, which would raise the specific fuel consumption of the exhaust emitting machinery. In addition, the apparatus herein disclosed acts essentially as a "double scrubber." As described below, the scrubbing apparatus comprises a section that consists of a number of pipes through which the flue gas flows and interacts with a fluid; after passing through this section, the gas flow continues to a cyclone scrubber for further cleaning. Surprisingly, the overall efficiency is significantly higher than would be expected from each of the scrubbers acting alone; in typical embodiments, 97-99% of the pollutants (e.g. $SO_x$) are removed from the flue gas stream.

It is therefore an object of present invention to disclose a double-pipe gas scrubbing apparatus for lowering the concentration of at least one component of a gas stream, wherein said apparatus comprises: (a) input means adapted to introduce at least one gas stream into said gas scrubbing apparatus; (b) exhaust means adapted to discharge at least one gas stream from said gas scrubbing apparatus; (c) a double pipe comprising an input pipe, an output pipe accommodated within said input pipe, and a space between the outer wall of said output pipe and the inner wall of said input pipe, said double pipe further comprising a first end and a second end; (d) means for providing a fluid connection between said input means and said input pipe; (e) means for providing a fluid connection between said output pipe and said exhaust means; (f) at least two bridge pipes in fluid connection with said second end of said input pipe, said bridge pipes disposed circumferentially about said input pipe substantially at said second end of said pipe; (g) fluid introducing means adapted for introducing at least one fluid into said gas scrubbing apparatus; (h) closure means for said space, said closure means comprising a first closure means disposed substantially at said first end of said input pipe; and a second closure means disposed substantially at said second end of said input pipe; said closure means adapted to prevent mass flow between said input pipe and the atmosphere surrounding said apparatus, and further adapted to maintain a fluid connection between said input means and said at least two bridge pipes via said input pipe; and, (i) a cyclone separator unit, said cyclone separator unit comprising cyclone unit input means in fluid connection with said at least two bridge pipes, a cyclone separator, gas output means in fluid connection with said second end of said output pipe, and liquid/solid output means.

It is a further object of this invention to disclose such a gas scrubbing apparatus as defined in any of the above, further comprising means for accelerating the flow of a gas stream through said bridge pipes.

It is a further object of this invention to disclose such a gas scrubbing apparatus as defined in any of the above, wherein at least one of said bridge pipes is disposed eccentrically about said input pipe.

It is a further object of this invention to disclose a two-pipe gas scrubbing apparatus for lowering the concentration of at least one component of a gas stream, wherein said apparatus comprises (a) input means adapted to introduce at least one gas stream into said gas scrubbing apparatus; (b) exhaust means adapted to discharge a gas stream from said gas scrubbing apparatus; (c) at least two input pipes, each of which comprises a first end and a second end; (d) an output pipe comprising a first end and a second end; (e) means for providing a fluid connection between said input means and each of said input pipes; (f) means for providing a fluid connection between said first end of said output pipe and said exhaust; (g) at least one bridge pipe in fluid connection with said second end of each of said input pipes; (h) fluid introducing means adapted for introducing at least one fluid into said apparatus; (i) means for accelerating the flow of said gas stream through at least one of said bridge pipes; and (j) a cyclone separator unit, said cyclone separator unit additionally comprising cyclone unit input means in fluid connection with said at least two bridge pipes, a cyclone separator, gas output means in fluid connection with said second end of said output pipe, and liquid/solid output means.

It is a further object of this invention to disclose a gas scrubbing apparatus as described in any of the above, wherein said input means comprises at least one inlet pipe.

It is a further object of this invention to disclose a two-pipe gas scrubbing apparatus as described in any of the above, wherein at least two of said input pipes are substantially parallel to each other.

It is a further object of this invention to disclose a gas scrubbing apparatus as described in any of the above, wherein said means for accelerating the flow of said gas stream through said bridge pipes comprises a plurality of fans, at least one of which is disposed in each of said bridge pipes.

It is a further object of this invention to disclose a gas scrubbing apparatus as described in any of the above, wherein said means for accelerating the flow of said gas stream through said bridge pipes comprises at least one fan disposed within said output pipe.

It is a further object of this invention to disclose a gas scrubbing apparatus as described in any of the above, wherein said means for accelerating the flow of said gas stream through said bridge pipes comprises two fans disposed in each of said bridge pipes.

It is a further object of this invention to disclose such a gas scrubbing apparatus, wherein the total capacity of said fans is greater than or equal to the rate at which said gas stream passes through said input means.

It is a further object of this invention to disclose a gas scrubbing apparatus as described in any of the above, wherein said fluid introducing means is adapted to introduce fluid into said gas stream downstream of said means for accelerating the flow of said gas stream.

It is a further object of this invention to disclose a gas scrubbing apparatus as described in any of the above, wherein said fluid introducing means is adapted to introduce said at least one fluid into said gas stream in at least one location chosen from the group consisting of (a) said space, (b) said bridge pipes, (c) substantially at said second end of said input pipes, (d) substantially at the entrance to said cyclone separator, and (e) substantially at said second end of output pipe.

It is a further object of this invention to disclose a gas scrubbing apparatus as described in any of the above, wherein said fluid introducing means is at least partially disposed about said output pipe.

It is a further object of this invention to disclose a gas scrubbing apparatus as described in any of the above, wherein said fluid introducing means is adapted to introduce fluid into said input pipe.

It is a further object of this invention to disclose a gas scrubbing apparatus as described in any of the above, wherein said fluid introducing means is adapted to introduce fluid into at least one of said bridge pipes.

It is a further object of this invention to disclose a gas scrubbing apparatus as described in any of the above, wherein said fluid introducing means comprises a plurality of nozzles disposed such that at least part of said fluid enters said gas stream in the form of droplets.

It is a further object of this invention to disclose a gas scrubbing apparatus as described in any of the above, wherein said fluid introducing means comprises at least one ring line and at least one nozzle in fluid connection with said at least one ring line and adapted to eject liquid in the form of droplets.

It is a further object of this invention to disclose a gas scrubbing apparatus as described in any of the above, wherein said fluid introducing means comprises at least one Venturi inlet disposed about the upper surface of said cyclone unit.

It is a further object of this invention to disclose a gas scrubbing apparatus as described in any of the above, wherein said fluid introducing means comprises (a) at least one ring line and at least one nozzle in fluid connection with said at least one ring line and adapted to eject liquid in the form of droplets; and (b) at least one Venturi inlet disposed about the upper surface of said cyclone unit.

It is a further object of this invention to disclose a gas scrubbing apparatus as described in any of the above, further comprising a housing, said housing disposed substantially near said first end of said input pipe, wherein said at least one passage connecting said input means to said input pipe, said at least one passage connecting said first fluid introducing means to at least one source of fluid and said at least one passage connecting said first end of said output pipe to said exhaust means are at least partially accommodated within said housing.

It is a further object of this invention to disclose such a gas scrubbing apparatus, wherein said first closure means comprise a mechanical connection between said housing and said outer pipe or pipes.

It is a further object of this invention to disclose a gas scrubbing apparatus as described in any of the above, further comprising at least one bypass passage configured to provide a fluid connection between said input pipe and at least one of the group consisting of (a) said output pipe, (b) said exhaust means, and (c) the atmosphere.

It is a further object of this invention to disclose a gas scrubbing apparatus comprising a bypass passage, further comprising a cover pipe surrounding said bypass passage.

It is a further object of this invention to disclose a gas scrubbing apparatus comprising a bypass passage, wherein said bypass passage is closable, said fluid connection being provided when said bypass passage is open.

It is a further object of this invention to disclose a gas scrubbing apparatus comprising a bypass passage, wherein said bypass passage is located substantially at said first end of said input pipes.

It is a further object of this invention to disclose a gas scrubbing apparatus comprising a bypass passage, wherein said bypass comprises a plurality of vanes disposed about the circumference of said passage.

It is a further object of this invention to disclose a gas scrubbing apparatus comprising a bypass passage, wherein said bypass is adapted to act as a droplet catcher.

It is a further object of this invention to disclose a gas scrubbing apparatus comprising a bypass passage, wherein said bypass passage is adapted to allow at least part of said gas stream to bypass said input pipe when the gas pressure at a predetermined location substantially at one predetermined end of said input pipe exceeds the gas pressure within said output pipe measured at a location substantially at the same end of said output pipe, and further wherein said bypass passage is further adapted to allow at least part of said gas stream to recirculate through said apparatus when the gas pressure at a predetermined location substantially at one predetermined end of said input pipe is less than or equal to the gas pressure within said output pipe at a location substantially at the same end of said output pipe.

It is a further object of this invention to disclose a gas scrubbing apparatus comprising a bypass passage, wherein said input means comprise at least one inlet pipe; and said bypass passage comprises at least one damper hingeably connected to the interior of said inlet pipe, the area of said damper sufficiently large such that when at one extreme of its travel, said damper substantially blocks gas flow through said fluid connection between said input pipe and at least one of the group consisting of (a) said output pipe, (b) said exhaust means, and (c) the atmosphere; and when at the other extreme of its travel, said damper substantially blocks gas flow from said inlet pipe to said input pipe; and said damper is adapted to move from the position in which it blocks said exhaust pipe to the position in which it blocks said inlet pipe when the pressure in said exhaust pipe exceeds the pressure in said inlet pipe by a predetermined amount.

It is a further object of this invention to disclose a gas scrubbing apparatus as defined in any of the above, further comprising fluid recirculation means, said fluid recirculation means comprising: fluid collecting means, said fluid collecting means disposed within said input pipe; and fluid delivery means adapted to pass at least part of the fluid collected by said fluid collecting means to at least one said of at least one fluid introducing means.

It is a further object of this invention to disclose a gas scrubbing apparatus as defined in any of the above, further comprising liquid condensing means adapted to condense droplets of liquid suspended in a gas.

It is a further object of this invention to disclose a gas scrubbing apparatus as defined in any of the above, further comprising recirculating means for transferring liquid from said liquid/solid output of said cyclone separator unit to at least one of said sources of fluid.

It is a further object of this invention to disclose a gas scrubbing apparatus as defined in any of the above, wherein said predetermined substance is chosen from the group consisting of (a) $SO_x$; (b) $NO_x$; (c) $CO_2$; (d) particulate matter; (e) polycyclic aromatic hydrocarbons; (f) any combination of the above.

It is a further object of this invention to disclose a gas scrubbing apparatus as defined in any of the above, wherein said fluid comprises a solution of base in water.

It is a further object of this invention to disclose such a gas scrubbing apparatus, wherein said base is NaOH.

It is a further object of this invention to disclose a gas scrubbing apparatus as defined in any of the above, wherein said fluid is chosen from the group consisting of (a) seawater; (b) an aqueous solution of NaOH; (c) a solution of NaOH in de-hardened seawater; (d) the remaining stream after de-hardening of seawater; (e) recycled stream from within said apparatus; (f) fresh water; and any combination of the above.

It is a further object of this invention to disclose such a gas scrubbing apparatus, wherein said fluid has undergone treatment prior to introduction into said apparatus.

It is a further object of this invention to disclose such a gas scrubbing apparatus, wherein said treatment is chosen from the group consisting of (a) filtration; (b) precipitation; (c) addition of absorbent material; (d) addition of adsorbent material; (e) centrifugation; (f) addition of base; and (g) any combination of the above.

It is a further object of this invention to disclose a gas scrubbing apparatus as defined in any of the above, wherein said at least one fluid introducing means comprises means for creating a first flow of fluid through said input pipe in one direction relative to said gas flow; and means for creating a second flow of fluid through said input pipe in a direction substantially opposed to that of the direction of said first flow and directed so that at least part the fluid entrained in said second flow will contact at least part of the fluid entrained in said first flow.

It is a further object of this invention to disclose such a gas scrubbing apparatus, wherein one of said first flow of fluid and said second flow of fluid comprises seawater, and further wherein the other of said first flow of said fluid and said second flow of fluid comprises a concentrated solution of base.

It is a further object of this invention to disclose a gas scrubbing apparatus as defined in any of the above, wherein said apparatus is located on board a ship.

It is a further object of this invention to disclose a gas scrubbing apparatus as defined in any of the above, wherein said gas stream comprises flue gas.

It is a further object of this invention to disclose a gas scrubbing apparatus located on board a ship as defined in any of the above, wherein said flue gas is produced by at least one engine on a ship.

It is a further object of this invention to disclose a gas scrubbing apparatus located on board a ship as defined in any of the above, wherein said flue gas is produced by a boiler on a ship.

It is a further object of this invention to disclose a gas scrubbing apparatus as defined in any of the above, further comprising means for agitation of said gas stream within said input pipe that comprises a plurality of vanes disposed about said space.

It is a further object of this invention to disclose a gas scrubbing apparatus as defined in any of the above, further comprising at least one droplet catcher.

It is a further object of this invention to disclose such a gas scrubbing apparatus, wherein said droplet catcher comprises a plurality of slots disposed about the outer circumference of said output pipe.

It is a further object of this invention to disclose a gas scrubbing apparatus as defined in any of the above, wherein at least one of said fluid introducing means is in fluid connection with a device for diluting a concentrated solution of MOH, said device for diluting a concentrated solution of MOH comprising a storage tank adapted for storing concentrated MOH solution; a source of a second aqueous solution; a membrane unit comprising a chamber; at least one hydroxide solution inlet fluidly connected to said storage tank and adapted to admit a fluid, mixture of fluids, and/or solution into said chamber; at least one aqueous solution inlet fluidly connected to said source of a second aqueous solution and adapted to admit a fluid, mixture of fluids, and/or solution into said chamber; at least one hydroxide solution outlet; at least one aqueous solution outlet; and an interior wall disposed within said chamber so as to divide said chamber into (a) at least one hydroxide flow chamber, said at least one hydroxide flow chamber fluidly connected to at least one hydroxide solution inlet and further fluidly connected to at least one hydroxide solution outlet and (b) at least one aqueous solution flow chamber, said at least one aqueous solution flow chamber fluidly connected to at least one aqueous solution inlet and further fluidly connected to at least one aqueous solution outlet, said wall at least partially comprising a membrane that is adapted to transmit selectively water molecules from one side of said membrane to the other, said membrane disposed such that one side of said membrane is in fluid contact with said at least one hydroxide flow chamber and the other side of said membrane is in fluid contact with said aqueous solution flow chamber; and further wherein said device is adapted to dilute a concentrated solution of MOH with water transmitted across said membrane from a second aqueous solution.

It is a further object of this invention to disclose such a gas scrubbing apparatus, wherein said means for fluidly connecting at least one of (a) said alkali hydroxide outlet or (b) said aqueous solution outlet to said at least one liquid inlet of said scrubber unit comprises means for fluidly connecting said alkali hydroxide outlet to said liquid inlet of said scrubber unit.

It is a further object of this invention to disclose such a gas scrubbing apparatus, wherein said source of a second aqueous solution comprises a source of seawater and an intake adapted to deliver seawater to said fluid connection source of a second aqueous solution and said aqueous solution inlet.

It is a further object of this invention to disclose such a gas scrubbing apparatus, wherein said membrane is chosen from the group consisting of consisting of ceramic membranes, polypropylene membranes, polysulfonate membranes, and any combination thereof.

It is a further object of this invention to disclose a gas scrubbing apparatus as defined in any of the above, further comprising collecting means for collecting a stream of wastewater prior to the input to said cyclone separator.

It is a further object of this invention to disclose such a gas scrubbing apparatus, further comprising means for recirculating at least part of the collected wastewater to said means for introducing fluid into said apparatus.

It is a further object of this invention to disclose such a gas scrubbing apparatus, wherein said collecting means are in fluid connection with a tank.

It is a further object of this invention to disclose such a gas scrubbing apparatus, wherein said tank is adapted to be openable to the atmosphere.

It is a further object of this invention to disclose such a gas scrubbing apparatus, further comprising additional input means in fluid connection with said tank, said additional input means adapted for introducing at least one additional substance into said tank.

It is a further object of this invention to disclose such a gas scrubbing apparatus, further comprising mixing means adapted to mix the contents of said tank.

It is a further object of this invention to disclose such a gas scrubbing apparatus, further comprising outlet means in fluid connection with said tank, said outlet means adapted to discharge at least part of the contents of said tank.

It is a further object of this invention to disclose such a gas scrubbing apparatus, wherein said outlet means is in fluid connection with a centrifuge.

It is a further object of this invention to disclose such a gas scrubbing apparatus, wherein said additional input means adapted to deliver at least one substance selected from the group consisting of $Ca(OH)_2$, $CaO$, $CaCO_3$, and a brine stream obtained after de-hardening of seawater.

It is a further object of this invention to disclose a method for reducing the concentration of at least one predetermined substance within a gas stream, said method comprising steps of: obtaining a gas scrubbing apparatus as defined in any of the above; introducing said gas stream into said input pipe or pipes; introducing a fluid into said gas scrubbing apparatus via said first fluid introducing means such that at least part of said gas stream contacts at least part of said liquid; introducing at least part of said gas stream into said cyclone separator unit; introducing a fluid into said gas scrubbing apparatus via said second fluid introducing unit such that at least part of said gas stream contacts at least part of said liquid substantially at the input into said cyclone separator unit; separating at least part of any liquid and/or particulate matter entrained in said gas stream from said at least part of said gas stream introduced into said cyclone separator unit within said cyclone separator unit; exhausting said gas stream via said output pipe subsequent to said step of separating at least part of any liquid and/or particulate matter entrained in said gas stream; and ejecting at least part of said liquid and/or particulate matter from said liquid/solid output.

It is a further object of this invention to disclose such a method, further comprising an additional step of accelerating said gas stream through said bridge pipes.

It is a further object of this invention to disclose a method as defined in any of the above, further including an additional step of recirculating at least part of said liquid ejected from liquid/solid output into said gas scrubbing apparatus.

It is a further object of this invention to disclose a method as defined in any of the above, further including additional steps of collecting liquid from said gas stream prior to the input to said cyclone separator unit; and recirculating at least part of the liquid collected in the prior step to at least one of said fluid introducing means.

It is a further object of this invention to disclose a method as defined in any of the above, further including an additional step of flowing gas directly from said input means to said exhaust means upon breakdown of a predetermined number of elements chosen from the group consisting of said first fluid introducing means; said second fluid introducing means; said cyclone separator unit; said means for accelerating said flow of gas through said bridge pipes; and said liquid recirculating means.

It is a further object of this invention to disclose a method as defined in any of the above, additionally comprising steps of providing a concentrated solution of at least one alkali metal hydroxide; providing a second aqueous solution; providing a membrane that selectively transmits water molecules; contacting said alkali metal hydroxide solution with one side of said membrane; contacting said second aqueous solution with the other side of said membrane such that water molecules are transmitted from said second aqueous solution through said membrane to said alkali metal hydroxide solution, whereby the concentration of said sodium hydroxide solution decreases and the concentration of said second aqueous solution increases during at least part of the time that said two solutions are in contact with said membrane and further whereby a diluted alkali metal hydroxide stream and a concentrated second aqueous solution stream are formed; and introducing at least a part of said diluted alkali metal hydroxide stream into said gas scrubbing apparatus via at least one of said liquid introducing means.

It is a further object of this invention to disclose a method as defined in any of the above, additionally comprising steps of mixing seawater with a basic solution within a SWPT module, whereby a precipitate comprising calcium and/or magnesium compounds is formed; dividing said mixture into at least two streams, at least one of which is a precipitate-rich stream and at least one of which is a precipitate-lean stream; and introducing at least part of said precipitate-rich and precipitate-lean streams into said gas scrubbing apparatus via at least one of said liquid introducing means.

It is a further object of this invention to disclose such a method, further comprising an additional step of operating said scrubber system as a closed-loop operation, whereby less than about 10% of said used solution stream is discharged.

It is a further object of this invention to disclose such a method, further comprising an additional step of operating said scrubber system as a once-through operation, whereby the majority of said used solution stream is discharged.

It is a further object of this invention to disclose such a method, wherein said scrubber system additionally comprises a pre-injection zone.

It is a further object of this invention to disclose such a method as defined in any of the above, further comprising an additional step of introducing at least part of said diluted stream of alkali hydroxide solution into said scrubber system through at least one inlet in said pre-injection zone.

It is a further object of this invention to disclose such a method, further comprising an additional step of providing osmotic pressure, wherein said osmotic pressure eliminates the need for a separate injection pump.

It is a further object of this invention to disclose a method as defined in any of the above, further comprising additional steps of collecting liquid from said gas stream prior to the input to said cyclone separator unit; and introducing at least part of this stream into a tank.

It is a further object of this invention to disclose such a method, further comprising an additional step of recirculating at least part of the liquid collected to said fluid introducing means.

It is a further object of this invention to disclose such a method, further comprising additional steps of opening said tank to the atmosphere; and evaporating at least part of the water from within said tank.

It is a further object of this invention to disclose such a method, further comprising an additional step of adding an additional substance to said tank.

It is a further object of this invention to disclose such a method, wherein said step of adding an additional substance to said tank further includes an additional step of adding at least one substance selected from the group consisting of $Ca(OH)_2$, $CaO$, $CaCO_3$, and a brine stream obtained after de-hardening of seawater.

It is a further object of this invention to disclose such a method, further including an additional step of mixing the contents of said tank.

It is a further object of this invention to disclose such a method, further including an additional step of discharging at least part of the contents of said tank.

It is a further object of this invention to disclose such a method, wherein said step of discharging at least part of the contents of said tank includes an additional step of discharging at least part of the contents of said tank into a centrifuge.

It is a further object of this invention to disclose a method as defined in any of the above, further including steps of providing a fluid connection between said input means and at least one chosen from the group consisting of (a) said output pipe, (b) said exhaust means, and (c) the atmosphere if the pressure in said input pipe falls below the pressure in said output pipe by a predetermined amount; closing said fluid connection between said input means and said output means if the pressure in said input pipe falls below the pressure in said output pipe by a predetermined amount; and passing said gas stream directly from said input pipe to said at least one chosen from the group consisting of (a) said output pipe, (b) said exhaust means, and (c) the atmosphere.

BRIEF DESCRIPTION OF THE DRAWINGS

In order to understand how the invention herein disclosed may be built and used in practice, the invention is now described with reference to the drawings, wherein.

DETAILED DESCRIPTION OF THE PREFERRED EMBODIMENTS

The present invention is described hereinafter with reference to the drawings, in which preferred embodiments are described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figures and described in the specification, but only as indicated in the accompanying claims, with the proper scope determined only by the broadest interpretation of said claims.

As used herein, the expression "$Nm^3$" refers to "normal cubic meters."

As used herein, the expression "wastewater" refers to any water that has passed through the apparatus disclosed herein at least once, or to any solution or suspension in water that has passed through the apparatus disclosed herein at least once. The term may, without limitation, refer to graywater, blackwater, turbid water, or a suspension of solid particles in water. The term may also, without limitation, refer to water that has passed through the apparatus after treatment.

As used herein, with reference to storage of a liquid, the term "tank" refers to any apparatus used for the storage of a liquid, without limitation to shape, size, or material of construction.

As used herein, the expression "MOH" refers to a basic hydroxide without reference to stoichiometry, including but not limited to alkali hydroxides, alkaline earth hydroxides, and ammonium hydroxides where "M" refers to the counterion(s).

As used herein, the expression "SWPT" refers to "seawater pretreatment."

As used herein, with reference to quantities, the term "about" indicates ±20% of the nominal quantity.

Figure 1A:
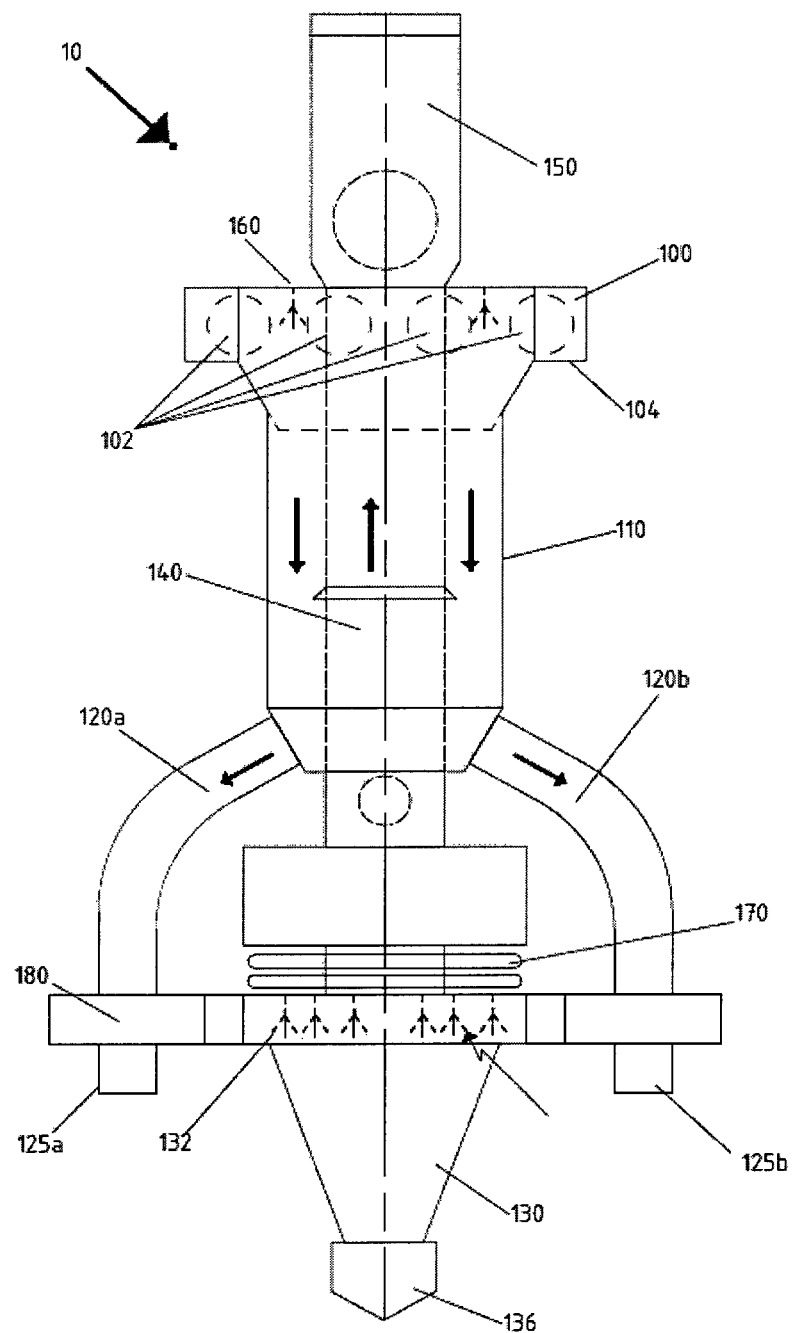
FIG. 1 presents a schematic drawing of one embodiment of the present invention.
Figure 1B:
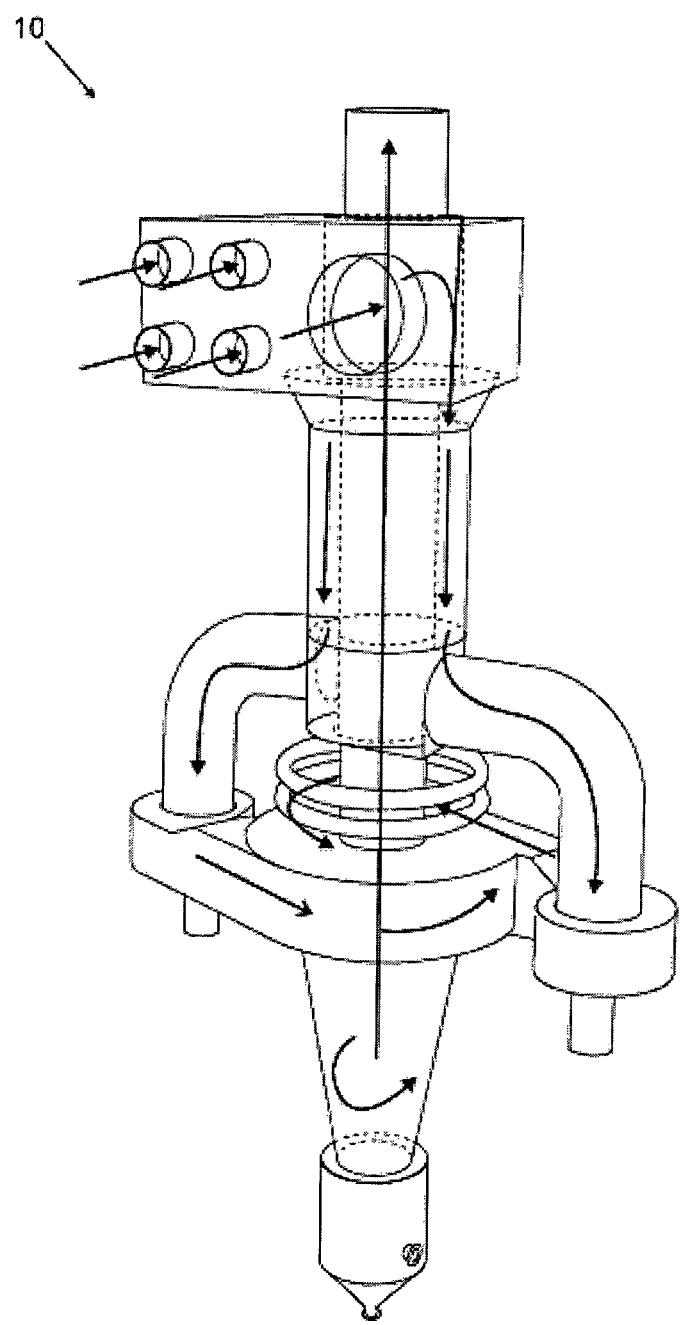

Reference is now made to FIG. 1A, which presents (not to scale) a schematic diagram of one embodiment (10) of the present invention. Flue gas enters the apparatus via input means 100 that is in fluid connection with the output(s) of the engine or other source of flue gas to be scrubbed. In the embodiment shown, input means 100 comprises a number of separate inlet pipes 102 that are located within housing 104. Input means 100 is in fluid connection with one end of input pipe 110. In preferred embodiments of the invention, inlet pipes 102 form a manifold that collects raw exhaust gases from one or more sources and keeps the gas flow from the sources separate until they are combined in input pipe 110. A second view of the apparatus, with the direction of gas flow indicated by the arrows, is given in FIG. 1B.

Figure 2:
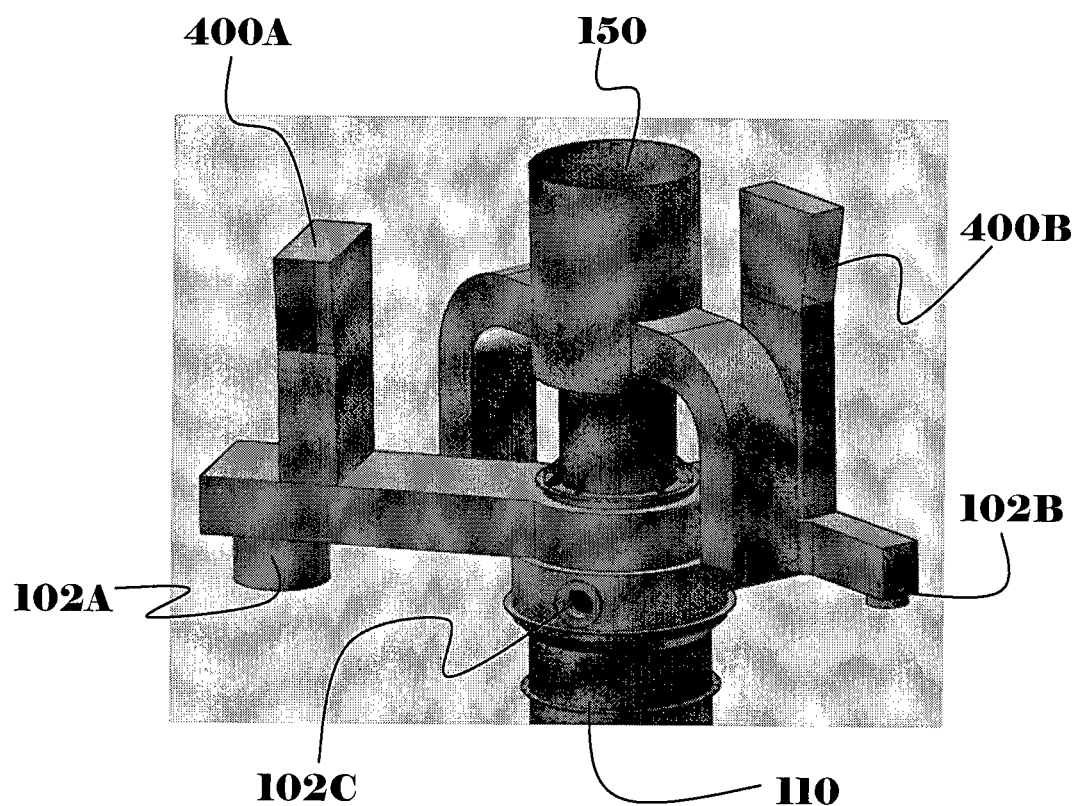
FIG. 2 presents a schematic view of the exhaust gas manifold arrangement according to one embodiment of the present invention.

Reference is now made to FIG. 2, which illustrates a typical non-limiting embodiment of manifold 102. In this embodiment, the manifold comprises three independent inlets, main engine inlet 102a, auxiliary engine inlet 102b, and boiler inlet 102c. These inputs are shown in relation to input pipe 110 where the gases mix and exhaust means 150. Also shown in the figure are bypass units 400 (in the embodiment illustrated, main engine bypass 400a and auxiliary engine bypass 400b), which are described in detail below.

Figure 3:
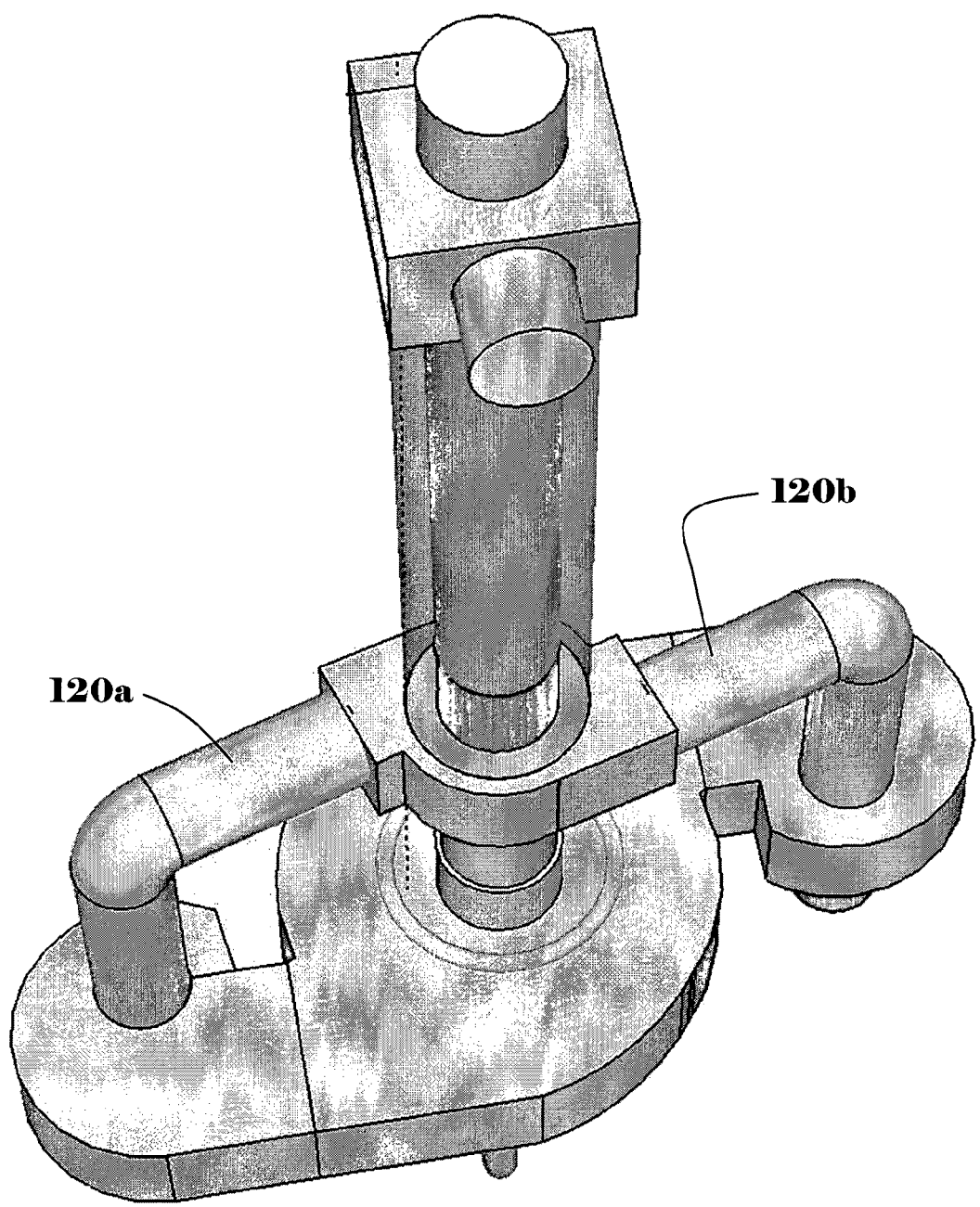
FIG. 3 presents a schematic top view of one embodiment of the present invention.

The second end of the input pipe is in fluid connection with a plurality of bridge pipes 120; the embodiment shown comprises two bridge pipes (120a and 120b). The two ends of each input pipe are closed so that gas cannot escape to the external atmosphere. Reference is now made to FIG. 3, which shows the disposition of the bridge pipes according to one embodiment of the present invention. As shown in the figure, in preferred embodiments of the invention, the bridge pipes are disposed eccentrically about the input pipe. That is, the bridge pipes are disposed such that the pipes do not sit directly across one from another, and a continuation of the horizontal axis of each bridge pipe does not intersect the horizontal axis of the input pipe.

The bridge pipes are in fluid contact with the entrance to cyclone separator unit 130. The general design of the cyclone separator unit can be according to any type known in the art. The entrance to the cyclone separator unit 132 is from the side. Gas exits from the top of the cyclone separator unit via exit 134 (not shown in FIG. 1). At the bottom of the cyclone separator unit is a liquid/solid output 136 for ejecting liquid and/or particulate matter separated from the gas stream in the cyclone. The main bulk of the water is collected in the cyclone unit's bottom sump, from where it is drained by gravity flow (e.g. through a pipe, not shown in the figure) the environment (e.g. the sea in shipboard use) or to a system tank for recycling. If necessary, the water undergoes treatment before discharge to the environment or recycling so that the water meets the appropriate standards for discharge into the environment or the properties required for water recycled into the system. The liquid thus ejected can be discharged from apparatus 10; for example, in applications on or near a body of water such as on a ship, the liquid can be ejected directly into the body of water. In other embodiments of the invention, at least a part of the liquid ejected at the liquid/solid output is recycled into the gas scrubber apparatus.

After exiting the cyclone separator unit, the gas enters output pipe 140, which is in fluid connection with the exit of the cyclone separator unit. As can be seen in the diagram, in preferred embodiments of the invention, the output pipe is disposed within the input pipe, i.e. the input/output pipe system forms a double pipe. The diameter of the output pipe is sufficiently small relative to that of the input pipe as to leave a space sufficient for the flue gas to flow from the input means to the cyclone separator. Output pipe 140 is in fluid connection with exhaust means 150 which exhausts the gas stream from the apparatus. The exhaust means may comprise one or more openings, additional piping, or any other means known in the art for exhausting gas from an apparatus through which gas flows.

In addition to these preferred "double-pipe" embodiments, other arrangements of the input and output pipes are within the scope of the invention. In particular, in other embodiments of the invention, the invention comprises a plurality of input pipes. In these "two-pipe" embodiments, the input pipes may be located externally to the output pipe. In preferred two-pipe embodiments, the input pipes are substantially parallel to each other. In these embodiments, at least one of the bridge pipes is in fluid connection with the second end of each of the input pipes. The remaining fluid connections are as in the "double-pipe" embodiment described above.

The general direction of flow of the gas stream through the apparatus is indicated by the arrows. In preferred embodiments of the invention, the apparatus further comprises means for accelerating the flow of gas stream. In the embodiment shown, this accelerating means comprises a plurality of fans (in the embodiment illustrated, two fans 125a and 125b are shown) located within or at the end of the bridge pipes and disposed so as to accelerate the flow of gas through the bridge pipes toward the cyclone. The fans have a capacity in excess of the maximum exhaust production anticipated given the size and capacity of the flue gas source (e.g. the engines of the ship on which the apparatus is being used).

The apparatus also includes means for fluid introduction. Introduction of fluid may be at one or more points along the flow through the input pipe, bridge pipes, or cyclone. In preferred embodiments of the invention, the fluid comprises a solution of NaOH in water; in other embodiments, the fluid may be any other appropriate basic aqueous solution, seawater, freshwater, brackish water, gray water, black water, the water remaining after de-hardening of seawater, a solution of NaOH in de-hardened seawater, or any other liquid known in the art that will react with the substance in the flue gas stream that the user wishes to have removed. As described in detail below, the fluid may comprise (entirely or in part) fluid that has been recycled from within the apparatus.

In preferred embodiments of the invention such as that illustrated in FIG. 1, the gas streaming through the system is exposed to fluid that has been introduced in two places. A pre-injection setup 160 introduces the fluid substantially at input means 100 or at the first end of input pipe 110. The fluid may be introduced by any means known in the art (nozzles, pipes, devices for producing a mist, etc.). The fluid introduction means is in fluid contact with a source of fluid, and is otherwise isolated from the gas flow. In the embodiment shown, fluid is also introduced at the entrance to the cyclone separator unit. In preferred embodiments of the invention, the pre-injection stage comprises a plurality of nozzles (possibly comprising separate sets of nozzles) that introduce fluid into the output pipe, where it contacts the raw flue gas. The fluid introduced may comprise a plurality of different compositions. For example, in more preferred embodiments of the invention, a concentrated NaOH solution is introduced by one set of nozzles, while another liquid (as a nonlimiting example, seawater) is introduced by a second set of nozzles. In the most preferred embodiments, the concentrated NaOH solution comprises a solution of about 50% NaOH (w/w) in water. Fans 125 ensure that the pre-injected fluid and the gas stream are well mixed. The pre-injection procedure additionally serves to quench the gas stream before it passes through the fans; in typical embodiments of the invention, the gas temperature at the entrance to the fans is ~80° C.

In preferred embodiments of the invention, the primary fluid injection, in which the bulk of the liquid is injected, occurs near the entrance of cyclone separator unit 130. In preferred embodiments such as the one illustrated in FIG. 1, a plurality of ring lines 170 are in fluid connection with at least one nozzle; in the most preferred embodiments, at least one Venturi inlet in fluid connection with the nozzles is disposed about the upper surface of the cyclone separator unit. This inlet system injects the liquid as droplets for improved contact with the gas. Additional gas-liquid contact is provided by the flow of the gas/liquid stream through the cyclone separator unit. In preferred embodiments of the invention, the fluid injected at the primary fluid injection stage is seawater, fresh water, or a mixture of the two.

The entire apparatus sits on a base 180. In typical embodiments, the base comprises a level horizontal frame underneath the fans and inlet cover. In some embodiments, e.g. where a retrofit is done in an area not previously dedicated to a scrubber, the base comprises a gallows-like construction welded onto main frame supporting the upper part of the system. This base is installed in a location most convenient for use of the apparatus. For example, it may sit on dry land, and the output of liquid/solid separator 136 is collected for recycling or disposal, or located with the apparatus sitting over a body of water so that the output of the liquid/solid separator runs directly into the body of water. The base may also be located on a boat, ship, or other seagoing vessel. For shipboard use, the basic frame structure may be further supported by stays attached to the vessel's funnel and superstructure. In other shipboard embodiments in which the scrubbing apparatus is installed within the funnel, additional support can be provided for the upper part of the apparatus, with both the frame and the additional support integrated into the funnel structure. In some embodiments, base 180 sits on a larger support structure of any type known in the art.

Figure 4A:
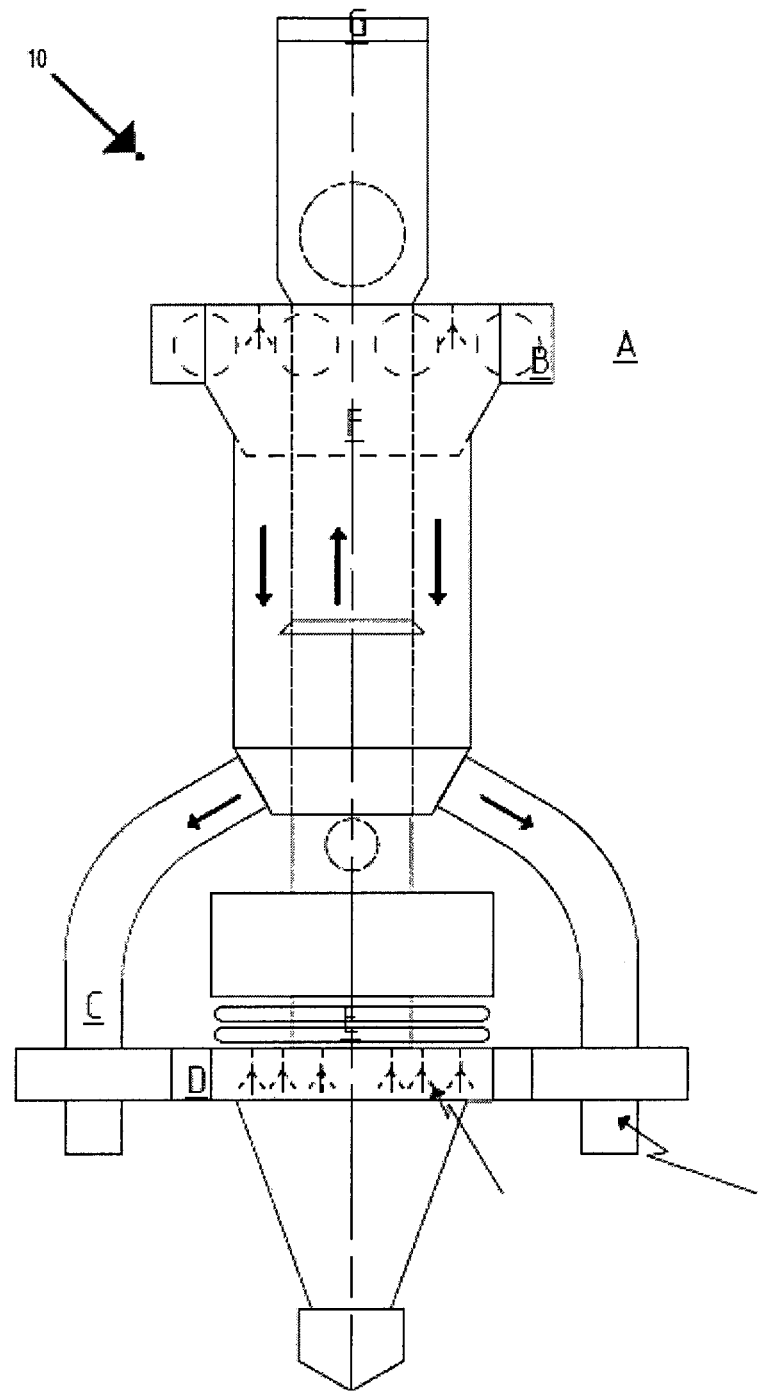
FIG. 4 presents an illustration of the relative pressures within the apparatus according to one embodiment of the invention.
Figure 4B:
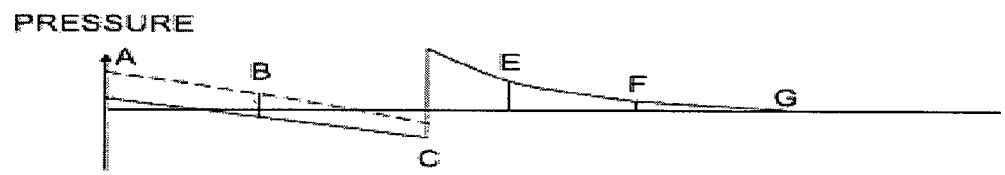

In preferred embodiments of the apparatus herein disclosed, the apparatus further comprises a bypass unit, which is described in greater detail below. The bypass unit is designed to divert the flow of gas (e.g. directly from the input 100 to exhaust 150) if a fault in the apparatus occurs. Reference is now made to FIG. 4, which illustrates a pressure profile within the gas flow during operation of the embodiment shown in FIG. 1. Seven locations within the gas flow are indicated in FIG. 4*a* by letters A-G. FIG. 4*b* illustrates graphically the relative pressures at the seven locations. The solid line shows the pressures under normal operation. The pressure falls from point A (input 100) to point C within the bridge pipes. At point D, located at the entrance to the cyclone separator (i.e. after the fans), the pressure is again higher, and then falls as the gas flows to exhaust 150 (point G), where the pressure is substantially atmospheric. In particular, the pressure at point B is lower than that at point F. The dashed line in the graph indicates a fault condition due to a failure of the apparatus. In this case, because of the lower flow, the pressure at point B rises, so much so that it becomes higher than the pressure at point F. When this fault condition occurs, a bypass passage (described in detail below) provides direct fluid connection between input pipe 110 and output pipe 140 such that the gas flow is diverted, bypassing the scrubbing unit.

In preferred embodiments, the invention further comprises means for recirculating the fluid used to clean the flue gas. The recirculation system comprises fluid collecting means disposed within the input pipe and fluid delivery means adapted to pass at least part of the fluid so collected to the reservoir in which the liquid used to react with the flue gas is stored. In some embodiments of the apparatus that comprise a double pipe system, the fluid collecting means are disposed about the outer diameter of the output pipe. In some embodiments of the invention, the fluid collecting means comprise least one droplet catcher. Any appropriate droplet catcher of a type known in the art may be used. In some embodiments, part or all of the fluid leaving the system via liquid/solid output 136 is collected and recycled back into the system.

Figure 5A:
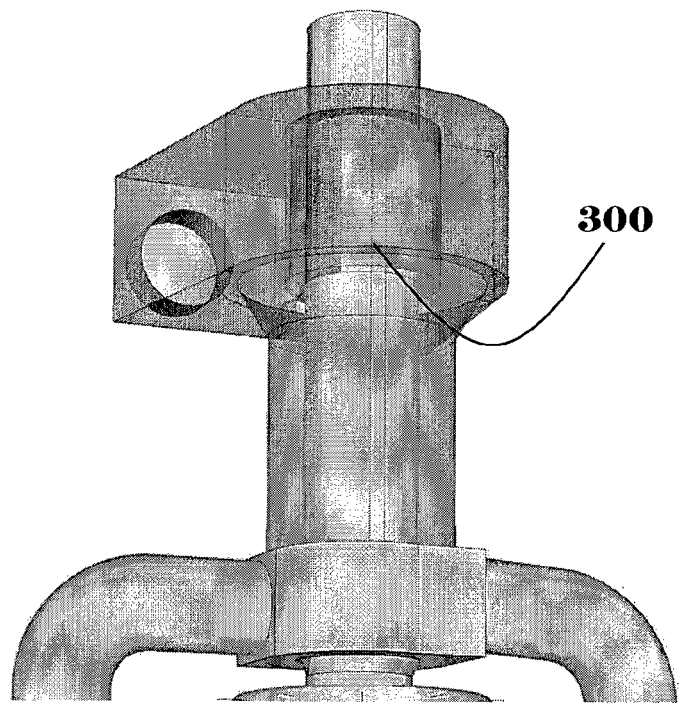
FIG. 5 presents a schematic illustration of a Bypass/Recirculation/Droplet Catcher unit according to one embodiment of the invention.
Figure 5B:
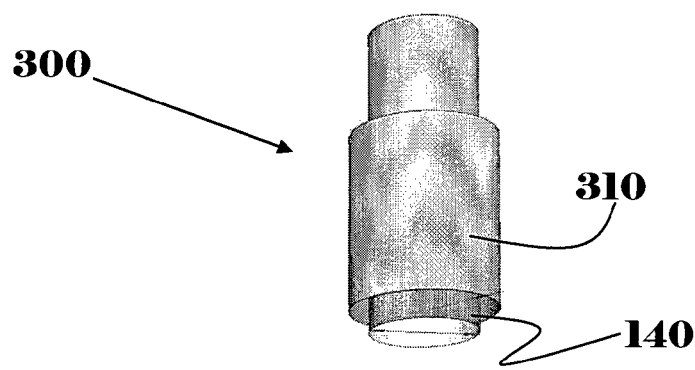

Reference is now made to FIG. 5, which shows a bypass/droplet catcher/recirculation (BDR) unit according to one embodiment of the present invention. BDR unit 300 is disposed about output pipe 140. FIG. 5*a* shows the location of the BDR unit within the apparatus in a typical embodiment of the invention; an enlarged view of the BDR unit itself is shown in FIG. 5*b*. The BDR unit is a section of the output pipe with a larger covering pipe 310 closed at the top and open at the bottom. The inner diameter of the larger covering pipe is typically ~35% larger than the outer diameter of the output pipe. For example, in an embodiment in which the output pipe's outer diameter is 1.1 m, the covering pipe will typically have an inner diameter of 1.5 m. The BDR unit has opening slots that allow clean exhaust gas to flow from the output pipe to the input pipe (recirculation mode), or raw flue gas to flow from the input pipe directly to the output pipe (bypass mode). In typical embodiments, the slots are approximately 10 cm×60 cm. In typical embodiments, the slots are shaped with vanes that force the gas passing through them to circulate in the same direction as the circulation caused by the cyclone generated in the cyclone separator unit. In recirculation mode, this forced flow and circulation carries the droplets of the liquid introduced into the apparatus toward the wall of the output pipe, and by the cyclone effect to pass through the slots.

The fraction of the exhaust that is recirculated through the unit depends on the amount of exhaust produced, i.e., as the engine load varies, the amount of gas recirculated through the system varies such that the fans 125 run at constant capacity. As the engine or boiler load fluctuates, the amount of gas recirculated through the system adjusts to compensate without any dedicated regulation mechanism between the unit and the exhaust gas source. This feature of the BDR allows all exhaust emitting sources to be connected to a single gas/liquid interface without affecting the backpressure in the respective exhaust lines. The operation of the gas scrubbing system is thus completely independent of the engine load and the backpressure produced by turbochargers or scavenging fans. With the apparatus disclosed in the present invention in operation, the BDR allows for recycling of liquid and clean exhaust gas back to the raw exhaust (input pipe) side.

Should the fans fail, the raw flue gas will be forced through the system and the BDR unit in bypass mode. In this manner, operation of the ship may continue uninterrupted until the fault in the scrubber has been repaired or a permanent bypass hatch located on or within housing 104 is opened.

Through this recycling feature of the BDR unit, the pressure at exhaust means 150 remains close to constant and ambient level independent of the engine or boiler loads relative to the speed of fans 125. The turbochargers or boiler fans thus remain unaffected and the scrubber may be operated at any desired gas and ambient water flow rates independent of engine or boiler loads.

Figure 6:
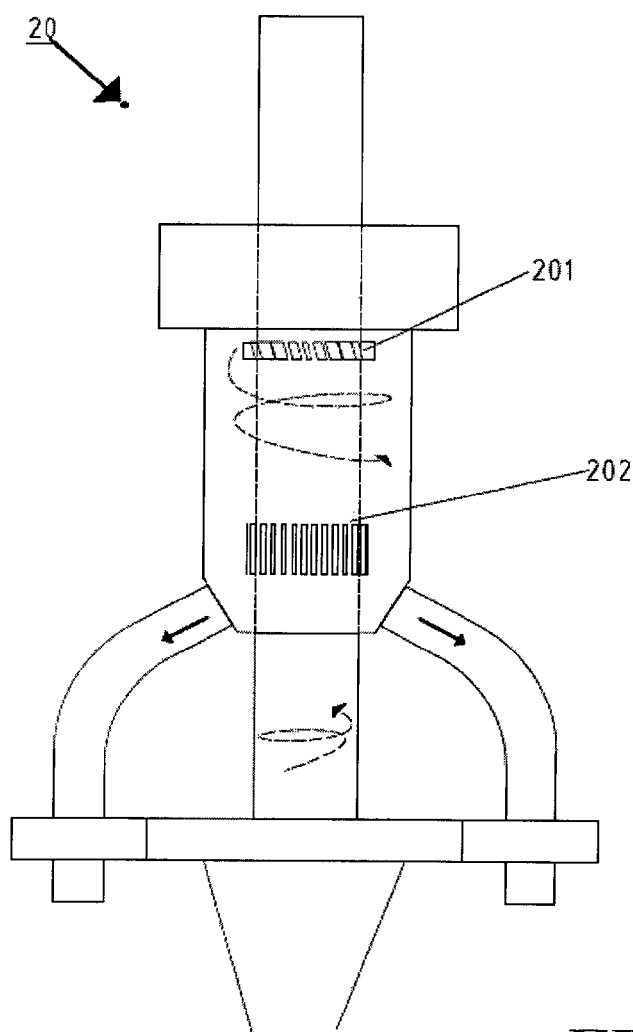
FIG. 6 presents a schematic drawing of an embodiment of the present invention that includes a droplet catcher and means for agitation of the inlet exhaust.

Reference is now made to FIG. 6, which illustrates a representative embodiment of the invention that comprises a fluid recirculation system. In the embodiment illustrated in the FIG. 20), a droplet catcher 202 is disposed within the input tube near the bridge pipes. The position of the droplet catcher (s) is not limited to that shown in this figure, which is shown for illustrative purposes only.

FIG. 6 also illustrates agitation means 201, disposed within the input pipe. The agitation means, which may be active (e.g. a fan) or passive (e.g. a plurality of vanes) is designed to increase the turbulence within the gas flow. Such turbulence will increase the contact between the gas and the droplets of liquid, thus increasing the efficiency of removal of the desired substance from the gas stream.

Figure 7A:
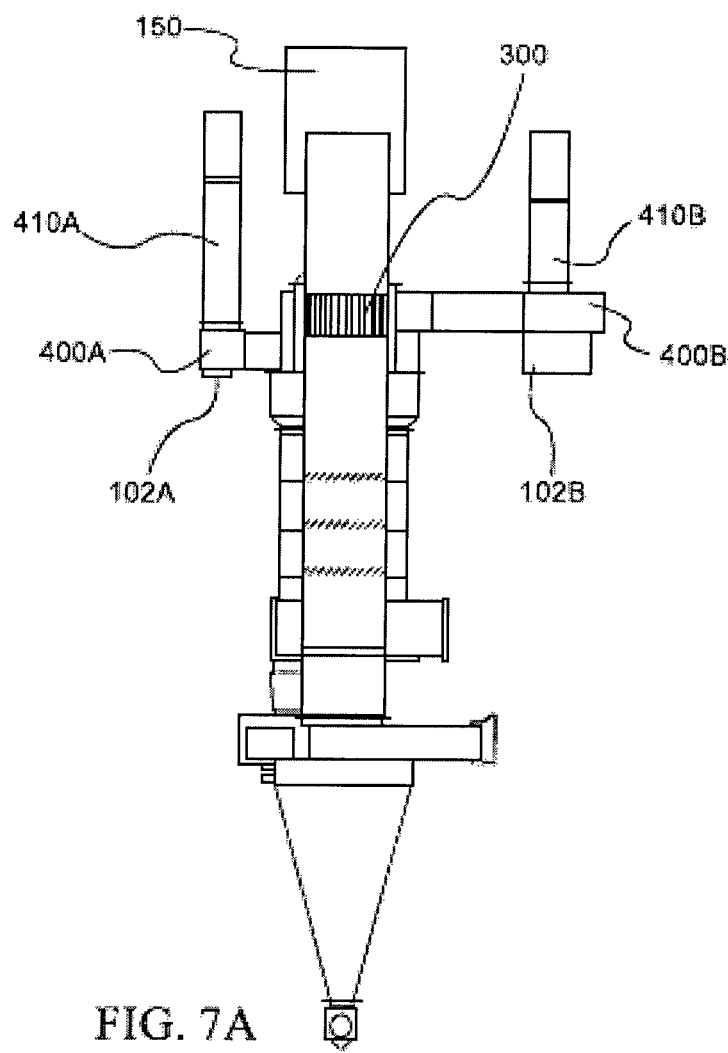
FIG. 7 presents a schematic drawing of one embodiment of a bypass system according to one embodiment of the present invention.
Figure 7B:
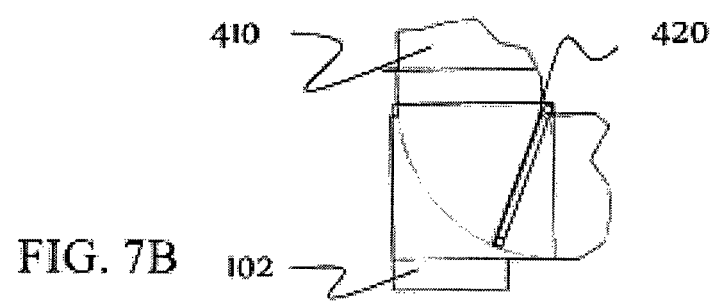

Reference is now made to FIG. 7, which presents an illustration of one embodiment of the bypass system 400 present in preferred embodiments of the invention. In the most preferred embodiment of the bypass system, each inlet pipe 102 has an associated bypass subsystem that is independent of any others present. FIG. 7a illustrates the bypass system with reference to the apparatus as a whole. The embodiment illustrated in FIG. 7 comprises two inlet pipes 102a and 102b each of which has its associated bypass system (400a and 400b, respectively). Each bypass system has an associated exhaust (410a and 410b, respectively, in the embodiment illustrated in FIG. 7a) that allows gas to be exhausted directly from the input pipe. In different embodiments of the invention, the gas can be exhausted directly to the atmosphere, or the outlet end of the exhaust pipe 410 can be connected to output pipe 140 or to exhaust means 150. Reference is now made to FIG. 7b, which illustrates a typical bypass system. The bypass system comprises a damper 420, hingeably connected to the interior of inlet pipe 102, the damper of area sufficient to block gas flow through exhaust pipe 410 when it is at one extreme of its travel, and to block gas flow from inlet pipe 102 to input pipe 110 when it is at the other extreme of its travel. When there is sufficient gas pressure in inlet pipe 102, the damper rises to close off exhaust pipe 410, and the exhaust gas flows into input pipe 110. If the gas pressure in the inlet pipe falls, or the backpressure rises (as a non-limiting example, due to loss of power to or failure of fans 125), the damper opens to exhaust pipe 410 and the gas vents to the atmosphere without passing through the scrubber. In the embodiment shown, there is no separate bypass for the boiler inlet (102c; see FIG. 2), the BDR itself serving as the bypass for the boiler inlet.

When the bypass unit is in operation, the pressure at the exhaust means 150 is of course atmospheric pressure. The maximum pressure in the outlet pipe will be approximately 5 mm $H_2O$ above atmospheric. When the fans 125 run at constant speed, the pressure in input pipe 110 will be less than that at the outlet of manifold (inlet pipe) 102, which will be less than 5 mm $H_2O$ above atmospheric. If the exhaust load is decreased (i.e. the pressure in the input pipe decreases), the system will balance the decreased pressure by increasing the flow of gas through the BDR.

Table 1 summarizes the system response to various failure modes in a most preferred embodiment of the apparatus that comprises both a BDR 300 and a bypass system 400.

TABLE 1

| Failure Mode | System Response/Action |
| --- | --- |
| Fan stops | Gas automatically flows in opposite direction through BDR, which acts as an emergency bypass. |
| Clogged system | Unlikely due to size of gas openings; if system clogging occurs, permanent bypass is activated |
| Loss of water flow | Temperature in system increases, bypass is activated |
| Sudden drop in exhaust production (e.g. engine stops) | More gas is recycled through BDR, pressure |

Figure 8A:
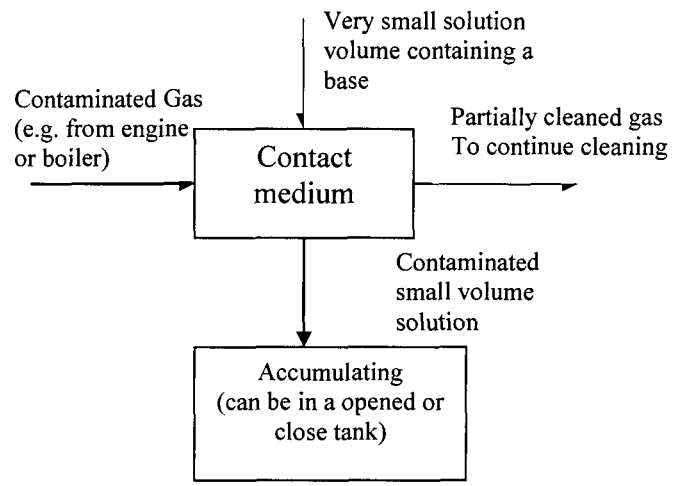
FIG. 8 presents flowcharts illustrating the steps of a method for cleaning wastewater prior to its discharge from the apparatus herein disclosed according to some embodiments of the invention; and, FIG. 9 illustrates schematically an MOH dilution unit according to one embodiment of the present invention.
Figure 8B:
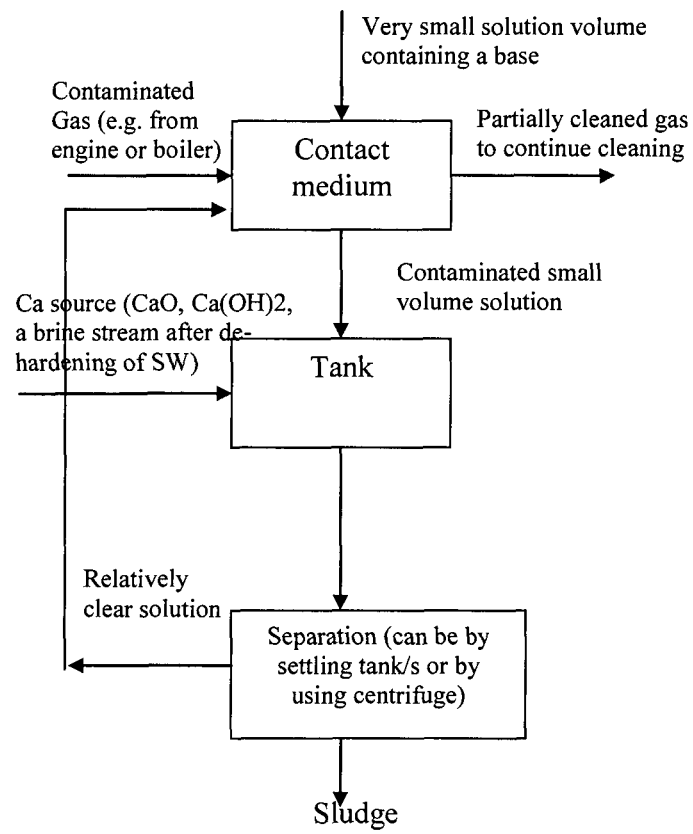

In preferred embodiments of the invention, the liquid leaving the apparatus is processed in a water treatment unit (WTU) before being discharged to the environment. The WTU is designed to clean the water to meet legal requirements for turbidity and PAH (polyaromatic hydrocarbon) levels of the discharged water. Injection with base prevents the pH of the discharged water from dropping below acceptable limits. In preferred embodiments of the invention, the WTU comprises monitors (any type known in the art may be used) of discharge water parameters such as pH, PAH, and turbidity, and the water is discharged to the environment only if it meets or exceeds the relevant legal standards. Reference is now made to FIG. 8, which illustrates a method for treating wastewater in the WTU according to some embodiments of the invention. FIG. 8a shows a general method, in which a relatively small amount of basic solution contacts the flue gas; in preferred embodiments, the volume ratio (liters liquid/$Nm^3$ gas) is between about 0.02 and about 0.8. The wastewater is then accumulated in a tank. The tank can be closed or open to the atmosphere; in embodiments in which the tank is open to the atmosphere, at least part of the water is evaporated in order to concentrate the remaining solution. FIG. 8b shows a more detailed scheme for the treatment of the wastewater according to preferred embodiments of the invention. The accumulated wastewater is further contacted with a Ca-containing stream derived from a source in fluid contact with the collection tank. The Ca source contains a Ca-containing substance such as CaO, $Ca(OH)_2$, $CaCO_3$, a brine stream obtained after dehardening of seawater, etc. Solids are then separated by any means known in the art; non-limiting examples include settling and centrifuging. The treated wastewater can then be discharged to the environment or, in some embodiments, recirculated into the fluid introducing means and returned to the apparatus.

In some embodiments of the invention, it is integrated with an apparatus for using seawater to dilute a concentrated MOH solution of the type disclosed in Israel Patent Application No. 202817, submitted 19 Dec. 2009, which is hereby incorporated by reference in its entirety. An apparatus of this type is especially useful for shipboard use, as it enables additional savings in space and weight by enabling transport of the MOH in the form of a highly concentrated solution which is then diluted in situ.

Figure 9:
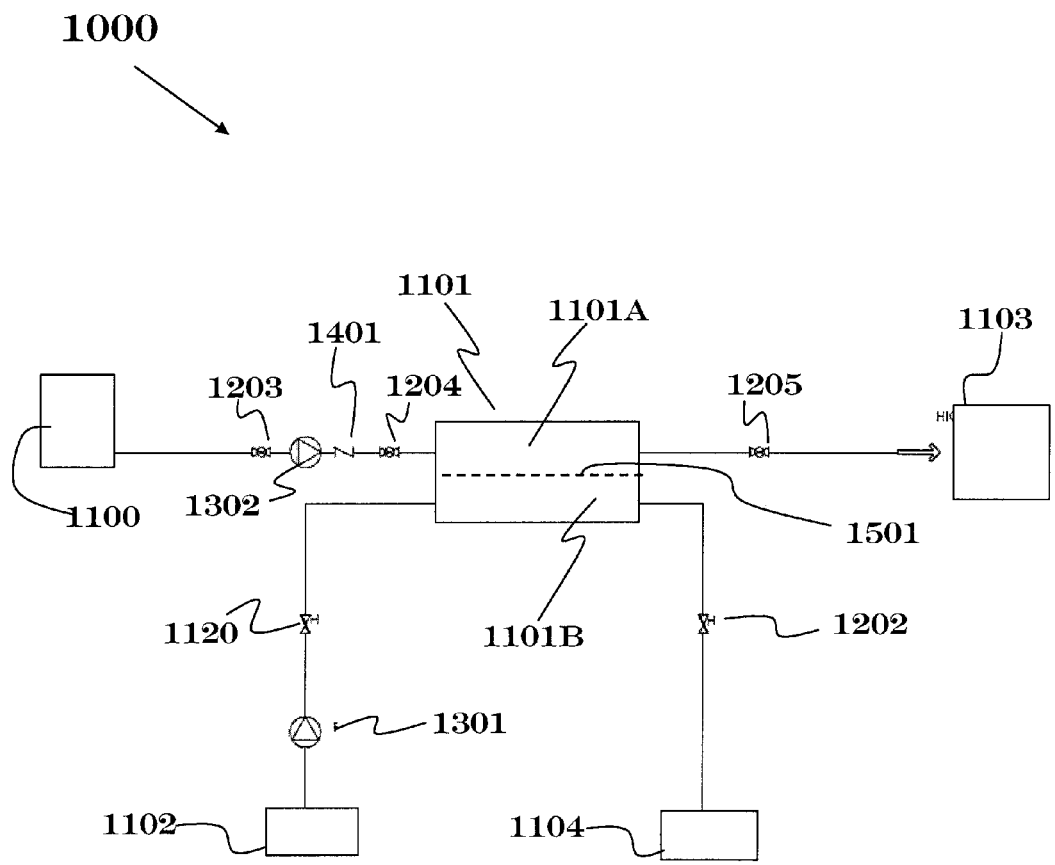

Reference is now made to FIG. 9, which illustrates schematically a typical embodiment 1000 of a method for using seawater to dilute a solution of MOH. A solution of MOH is stored in tank 1100. In preferred embodiment of the invention, the concentration of the solution is between about 10% and about 50% MOH (w/w). In a more preferred embodiment of the invention, the concentration of the MOH solution is between about 30% and about 50% (w/w). In most preferred embodiments of the invention, the alkali metal hydroxide used is NaOH.

The method and system herein disclosed further comprises membrane unit 1101, which comprises at least one membrane

1501. Membrane 1501 is of a type that selectively transmits water molecules, but not more than a negligible amount of solute. Such membranes are well-known in the art; examples of suitable materials for the membrane include ceramic, polypropylene, and polysulfonates. Membrane unit 1101 is divided into at least two chambers (in the embodiment illustrated in FIG. 9, it is divided into two chambers 1101A and 1101B), with membrane 1501 disposed within the membrane unit such that fluid within chamber 1101A can contact one side of the membrane and fluid within chamber 1101B can contact the other side of the membrane. Membrane unit 1101 is constructed such that the chambers are substantially isolated from one another, i.e., passage of molecules from one chamber to the other can occur substantially only via membrane 1501.

The MOH solution flows from tank 1100 to membrane unit 1101; in the embodiment illustrated in FIG. 9, the MOH solution is introduced into chamber 1101A. In preferred embodiments of the invention, the MOH solution flows from tank 1100 to the membrane unit via valve 1203, pump 1302, check valve 1401, and a second valve 1204.

Seawater is introduced into membrane unit 1101 (in the embodiment illustrated in FIG. 9, into chamber 1101B) via seawater intake 1102. In preferred embodiments of the invention, the seawater passes through pump 1301 and valve 1201. Except for contact with the two sides of the membrane, the seawater and concentrated MOH solution are isolated from one another throughout the process. In preferred embodiments of the invention, the volume ratio within the membrane unit between the MOH solution and the seawater is between about 1:4000 and 1:400. Inside the membrane unit, water passes through the membrane from the relatively dilute seawater solution into the concentrated MOH, diluting the MOH solution to a predetermined level, and thereby concentrating the seawater. The dilute MOH solution exits the membrane unit via valve 1205 to dosing point 1103, while the seawater exits the membrane unit through valve 1202 to exit point 1104.

Valves 1201-1205 may be of any appropriate type chosen from those well-known in the art; in preferred embodiments of the invention, globe valves are used. Likewise, pumps 1301 and 1302 and check valve 1401 may be of any appropriate type or types chosen from those well-known in the art.

According to the method herein disclosed, any aqueous solution that is less concentrated in any solute than the concentrated MOH solution provided from tank 1100 can be used in place of seawater. In non-limiting alternative embodiments of the invention, the second aqueous solution is chosen from the group consisting of brackish water, processed water, wastewater, aqueous industrial streams, seawater, at least partially treated salt water, or any combination thereof.

As the $H_2O$ molecules diffuse through the semi-permeable membrane, the pressure (or volume) will increase until osmotic equilibrium is achieved. The theoretical osmotic pressure that is obtained upon dilution of 50% NaOH to 5% is at least 40 bars. This pressure can be regulated to some extent by controlling the flow ratio between the MOH solution and the second aqueous solution to the membrane unit. In some embodiments of the invention, this increase in osmotic pressure is used to inject the diluted MOH into the exhaust gas using an atomizing nozzle. These embodiments have the advantage of saving significant amounts of energy, as it will be necessary to pump only about 1 L of concentrated MOH for every 10 L of diluted MOH injected into the exhaust gas.

Membranes that selectively transmit water are well-known in the art; the membrane used in the method disclosed here may be of any type appropriate for extended contact with strong base and with the second aqueous solution used in the particular embodiment of the method employed. In addition, the membrane used is of a type appropriate for limiting anion exchange through the membrane. In preferred embodiments of the invention, the membrane is of a type that is additionally characterized as being able to withstand high osmotic pressure. In preferred embodiments of the invention, the membrane is selected from the group consisting of ceramic membranes, polypropylene membranes, polysulfonate membranes, and any combination thereof.

In preferred embodiments of the dilution apparatus, it comprises an SWPT module. The aqueous solution is treated within the SWPT module with a substance that selectively bonds divalent ions over monovalent ions (SSBD). Nonlimiting examples of such substances include flocculants, complexants, and ion exchange materials. By this method, divalent ions such as $Ca^{++}$ and $Mg^{++}$ that can lead to fouling of the system are selectively removed from the solution being used to treat the flue gas by forming an SSBD-ion complex or compound. The bound SSBD-ion complex is then separated from the aqueous solution; in some embodiments, it is added to the used water stream produced by the FGD system. At least part of the remaining aqueous solution (i.e., from which the SSBD-ion complex has been removed) is mixed with an MOH solution, the resulting mixture introduced into the FGD unit, and the flue gas treated as described in detail above. In preferred embodiments, the entire system is located on a ship. In preferred embodiments, the flocculant is a hydrocolloid-based flocculant. In some embodiments, the FGD system includes at least one cyclone unit, preferably of a type disclosed above.

EXAMPLES

Example 1

Flue gas with a flow of about 43,000 $Nm^3/h$ that was produced by using diesel engines on a ship was contacted with only 350 $m^3/h$ seawater (SW) by using an embodiment of the invention herein disclosed comprising two input pipes, each of which was connected to one bridge pipe containing a fan. The engines were run with fuel having a sulfur content of 3% w/w. The temperatures of the entering and exiting gaseous streams were 153° C. and 37° C., respectively. The $SO_2$ concentrations in the flue gas streams entering and exiting the unit were 570 and 66 ppm respectively, thus, an 88.4% reduction in $SO_2$ concentration was obtained by using SW alone.

Example 2

Flue gas with a flow of about 43,000 $Nm^3/h$ that was produced by using diesel engines on a ship was contacted with first with 120 l/h 50% NaOH solution in 4 $m^3/h$ water then with 200 $m^3/h$ SW by using the same apparatus as was used in the previous example. The engines were run with fuel having a sulfur content of 3% w/w. The temperatures of the entering and exiting gaseous streams were 145° C. and 43° C., respectively. The SO2 concentrations in the flue gas streams entering and exiting the unit were 580 and 6 ppm respectively, thus, a 99% reduction in $SO_2$ concentration was achieved in this case.

Example 3

In 8 independent experiments, flue gas produced by using a 3 cylinder 4 stroke engine with a maximum output of 660 kW was contacted with aqueous solution by using an apparatus as disclosed herein with a total volume of about 1.46 m³. Table 2 presents the test conditions and the results for each experiment. The last row in each column describes the calculated equivalent concentration of sulfur in the fuel, based on amount of fuel consumed and the total $SO_2$ emission from the apparatus. In all cases, the amount of $SO_2$ trapped was sufficiently high that the emission met or exceeded the limitation of 0.1% S in fuel required by MARPOL regulation 14 Annex VI.

TABLE 2

| | Test | | | | | | | |
|---|---|---|---|---|---|---|---|---|
| | 1 | 2 | 3 | 4 | 5 | 6 | 7 | 8 |
| Fuel consumption [g/s] | | | 21.3 | 20.9 | | | | 21.6 |
| Exhaust flow [kg/s] | 0.91 | 0.91 | 0.91 | 0.82 | 0.82 | 0.82 | 0.82 | 0.95 |
| T gas inlet collector [° C.] | 217.5 | 222.3 | 238.7 | 237.2 | 226.8 | 225.7 | 215.0 | 222.1 |
| Liquid/Gas volume ratio [L/Nm³] | 4.8 | 4.8 | 4.8 | 5.4 | 5.4 | 5.4 | 7.0 | 7.0 |
| NaOH solution (48% w/w) added [L/h] | 5.33 | 5.33 | 4.83 | 4.33 | 3.83 | 4.08 | 4.08 | 4.21 |
| pH of water discharged | 6.12 | 6.12 | 5.96 | 5.88 | 5.84 | 5.9 | 5.95 | 5.98 |
| $SO_2$ concentration after apparatus [ppm] | 18 | 15 | 14.5 | 16 | 17.5 | 16.5 | 11 | 9.5 |
| $SO_2$ trapping [%] | 96.04 | 96.70 | 96.81 | 96.48 | 96.15 | 96.37 | 97.58 | 97.91 |
| Equivalent S in fuel [%] | 0.10 | 0.08 | 0.08 | 0.08 | 0.09 | 0.09 | 0.06 | 0.05 |

We claim:

1. A gas scrubbing apparatus for lowering the concentration of at least one component of a gas stream, comprising:
   input means for introducing at least one gas stream into said gas scrubbing apparatus, said input means comprising at least one inlet pipe;
   exhaust means for discharging a gas stream from said gas scrubbing apparatus;
   an input/output pipe assembly comprising at least one input pipe comprising a first end and a second end and at least one output pipe comprising a first end and a second end, said assembly constructed from components selected from the group consisting of:
   (a) at least two input pipes and an output pipe; and,
   (b) a double pipe comprising an input pipe, an output pipe accommodated within said input pipe, and a space between an outer wall of said output pipe and an inner wall of said input pipe, said double pipe further comprising a first end and a second end;
   first fluid connection means for providing a fluid connection between said input means and each of said input pipes;
   second fluid connection means for providing a fluid connection between said first end of said output pipe and said exhaust;
   a housing disposed substantially near said first end of said input pipe, wherein said first fluid connection means and said second fluid connection means are at least partially accommodated within said housing;
   if said input/output pipe assembly comprises at least two input pipes, at least one bridge pipe in fluid connection with said second end of each of said input pipes;
   if said input/output pipe assembly comprises a double pipe, at least two bridge pipes in fluid connection with said second end of said input pipe, said bridge pipes disposed circumferentially about said input pipe substantially at said second end of said pipe;
   a cyclone separator unit, said cyclone separator unit comprising:
   cyclone unit input means;
      if said input/output pipe assembly comprises at least two input pipes, said cyclone unit input means in fluid connection with said at least one bridge pipe;
      if said input/output pipe assembly comprises a double pipe, said cyclone unit input means in fluid connection with said at least two bridge pipes;
   a cyclone separator;
   gas output means in fluid connection with said second end of said output pipe; and,
   liquid/solid output means; and,
   fluid introducing means for introducing at least one fluid into said apparatus in at least one location chosen from the group consisting of (a) said bridge pipes, (b) substantially at said second end of said input pipes, (c) substantially at the entrance to said cyclone separator, and (d) substantially at said second end of said output pipe;
   wherein said gas scrubbing apparatus further comprises a plurality of fans, at least one of which is disposed within each of said bridge pipes so as to accelerate the flow of said gas stream through said bridge pipe toward said cyclone unit input means, the total capacity of said fans being greater than or equal to the rate at which said gas stream passes through said input means.

2. The gas scrubbing apparatus according to claim 1, further comprising at least one fan disposed within said output pipe.

3. The gas scrubbing apparatus according to claim 1, wherein said fluid introducing means is at least partially disposed about said output pipe.

4. The gas scrubbing apparatus according to claim 1, wherein said fluid introducing means comprise additional components selected from the group consisting of (a) a plurality of nozzles and (b) at least one ring line and at least one nozzle in fluid connection with said at least one ring line, said additional components thereby introducing at least part of said fluid entering said gas stream in the form of droplets.

5. The gas scrubbing apparatus according to claim 1, further comprising at least one bypass passage, said bypass passage configured to provide a fluid connection between said input pipe and at least one of the group consisting of (a) said output pipe, (b) said exhaust means, and (c) the atmosphere, and optionally comprising at least one component selected from the group consisting of (a) a cover pipe surrounding said bypass passage and (b) a plurality of vanes disposed about the circumference of said passage.

6. The gas scrubbing apparatus according to claim 5, wherein said bypass passage comprises a bypass/droplet catcher/recirculation unit and a cover pipe disposed about said output pipe, and is configured to provide a fluid connection between said input pipe and said output pipe.

7. The gas scrubbing apparatus according to claim 5, wherein said bypass passage is closable, said fluid connection being provided when said bypass passage is open.

8. The gas scrubbing apparatus according to claim 5, wherein said bypass passage is located substantially at said first end of said input pipes.

9. The gas scrubbing apparatus according to claim 5, wherein:
said input means comprise at least one inlet pipe;
said bypass passage comprises at least one damper (420) hingeably connected to the interior of said inlet pipe, the area of said damper sufficiently large such that:
when at one extreme of its travel, said damper substantially blocks gas flow through said fluid connection between said input pipe and at least one of the group consisting of (a) said output pipe, (b) said exhaust means, and (c) the atmosphere; and,
when at the other extreme of its travel, said damper substantially blocks gas flow from said inlet pipe to said input pipe; and,
said damper is adapted to move from the position in which it blocks said exhaust pipe to the position in which it blocks said inlet pipe when the pressure in said exhaust pipe exceeds the pressure in said inlet pipe by a predetermined amount,
thereby allowing at least part of said gas stream to bypass said input pipe when the gas pressure at a predetermined location substantially at one predetermined end of said input pipe exceeds the gas pressure within said output pipe measured at a location substantially at the same end of said output pipe and allowing at least part of said gas stream to recirculate through said apparatus when the gas pressure at a predetermined location substantially at one predetermined end of said input pipe is less than or equal to the gas pressure within said output pipe at a location substantially at the same end of said output pipe.

10. The gas scrubbing apparatus according to claim 1, further comprising fluid recirculating means, said fluid recirculating means comprising:
fluid collecting means, said fluid collecting means disposed at a location selected from the group consisting of (a) within said input pipe and (b) at the liquid/solid output of said cyclone separator; and,
fluid delivery means adapted to pass at least part of the fluid collected by said fluid collecting means to at least one said of at least one fluid introducing means.

11. The gas scrubbing apparatus according to claim 1, wherein said fluid is selected from the group consisting of (a) seawater; (b) an aqueous solution of NaOH; (c) a solution of NaOH in de-hardened seawater; (d) the remaining stream after de-hardening of seawater; (e) recycled stream from within said apparatus; (f) fresh water; (g) any of the preceding fluids that has been treated by a method chosen from the group consisting of filtration, precipitation, addition of absorbent material, addition of adsorbent material, centrifugation, and addition of base; and (g) any combination of the above.

12. The gas scrubbing apparatus according to claim 1, wherein said at least one fluid introducing means comprises:
first fluid flow means for creating a first flow of fluid through said input pipe in one direction relative to said gas flow; and,
second fluid flow means for creating a second flow of fluid through said input pipe in a direction substantially opposed to that of the direction of said first flow and directed so that at least part the fluid entrained in said second flow will contact at least part of the fluid entrained in said first flow.

13. The gas scrubbing apparatus according to claim 12, wherein one of said first flow of fluid and said second flow of fluid comprises seawater, and further wherein the other of said first flow of said fluid and said second flow of fluid comprises a concentrated solution of base.

14. The gas scrubbing apparatus according to claim 1, wherein said component of said gas stream is chosen from the group consisting of (a) $SO_x$; (b) $NO_x$; (c) $CO_2$; (d) particulate matter; (e) polycyclic aromatic hydrocarbons; (f) any combination of the above.

15. The gas scrubbing apparatus according to claim 1, further comprising agitating means for agitation of said gas stream within said input pipe that comprises a plurality of vanes disposed about said space.

16. The gas scrubbing apparatus according to claim 1, further comprising at least one droplet catcher.

17. The gas scrubbing apparatus according to claim 16, wherein said droplet catcher comprises a plurality of slots disposed about the outer circumference of said output pipe.

18. A method for reducing the concentration of at least one predetermined substance within a gas stream, said method comprising steps of:
obtaining a gas scrubbing apparatus according to claim 1;
introducing said gas stream into said input pipe or pipes;
accelerating said gas stream through said bridge pipes toward said cyclone separator unit by means of at said least one fan placed in each bridge pipe;
introducing a fluid into said gas scrubbing apparatus via said fluid introducing means such that at least part of said gas stream contacts at least part of said liquid;
introducing at least part of said gas stream into said cyclone separator unit;
introducing a fluid into said gas scrubbing apparatus such that at least part of said gas stream contacts at least part of said liquid substantially at the input into said cyclone separator unit;
separating at least part of any liquid and/or particulate matter entrained in said gas stream from said at least part of said gas stream introduced into said cyclone separator unit within said cyclone separator unit;
exhausting said gas stream via said output pipe subsequent to said step of separating at least part of any liquid and/or particulate matter entrained in said gas stream; and,
ejecting at least part of said liquid and/or particulate matter from said liquid/solid output.

19. The method according to claim 18, further including an additional step of flowing gas directly from said input means to said exhaust means upon breakdown of a predetermined number of elements chosen from the group consisting of said fluid introducing means; said cyclone separator unit; said at least one fan; and fluid recirculating means.

20. The method according to claim 18, further including steps of:
providing a fluid connection between said input means and at least one chosen from the group consisting of (a) said output pipe, (b) said exhaust means, and (c) the atmosphere if the pressure in said input pipe falls below the pressure in said output pipe by a predetermined amount;

closing said fluid connection between said input means and said output means if the pressure in said input pipe falls below the pressure in said output pipe by a predetermined amount; and, passing said gas stream directly from said input pipe to said at least one chosen from the group consisting of (a) said output pipe, (b) said exhaust means, and (c) the atmosphere.

* * * * *